US012582034B2

(12) United States Patent
Kadam et al.

(10) Patent No.: US 12,582,034 B2
(45) Date of Patent: Mar. 24, 2026

(54) CROP RESIDUE DISTRIBUTOR ASSEMBLY FOR A COMBINE HARVESTER

(71) Applicant: DEERE & COMPANY, Moline, IL (US)

(72) Inventors: Ajit Kadam, Pune (IN); Christina Fries, Nohfelden (DE); Eric Pellegrini, Sarreguemines (FR); Tushar Narlawar, Chandrapur (IN)

(73) Assignee: Deere & Company, Moline, IL (US)

( * ) Notice: Subject to any disclaimer, the term of this patent is extended or adjusted under 35 U.S.C. 154(b) by 431 days.

(21) Appl. No.: 18/144,296

(22) Filed: May 8, 2023

(65) Prior Publication Data

US 2023/0354744 A1 Nov. 9, 2023

(30) Foreign Application Priority Data

May 9, 2022 (DE) .......................... 102022111434.1

(51) Int. Cl.
*A01D 41/12* (2006.01)
*A01D 41/127* (2006.01)

(52) U.S. Cl.
CPC ....... *A01D 41/1243* (2013.01); *A01D 41/127* (2013.01)

(58) Field of Classification Search
CPC .. A01D 41/1243; A01D 41/127; A01D 43/14; A01F 12/40
See application file for complete search history.

(56) References Cited

U.S. PATENT DOCUMENTS

| | | | |
|---|---|---|---|
| 2,708,582 A | 5/1955 | Adams | |
| 4,921,469 A * | 5/1990 | Scharf | A01D 41/1243 460/10 |
| 6,860,805 B2 * | 3/2005 | Kuhn | A01F 12/444 460/99 |
| 2002/0072400 A1 * | 6/2002 | Foth | A01F 12/40 460/112 |
| 2004/0242291 A1 * | 12/2004 | Weichholdt | A01D 41/1243 460/112 |
| 2022/0408642 A1 * | 12/2022 | Mygind Bojsen | A01D 41/1243 |
| 2023/0100290 A1 * | 3/2023 | Faulkner | A01D 75/28 460/111 |

FOREIGN PATENT DOCUMENTS

| | | |
|---|---|---|
| DE | 3530195 C1 | 3/1987 |
| DE | 3838936 C2 | 5/1989 |
| DE | 10209722 A1 | 10/2003 |
| DE | 10336772 A1 | 3/2005 |
| DE | 102009011094 A1 | 9/2010 |
| EP | 2266381 A1 | 12/2010 |
| EP | 3039956 B1 | 8/2018 |

* cited by examiner

*Primary Examiner* — Brad Harcourt
(74) *Attorney, Agent, or Firm* — Taft Stettinius & Hollister LLP; Stephen F. Rost

(57) ABSTRACT

A crop residue distributor assembly for a combine harvester. The crop residue distributor includes a straw distributor hood, below which a number of adjustable vanes is arranged on both sides of a longitudinal median plane of the crop residue distributor assembly. A flow divider is arranged adjacent to the longitudinal media plane with diverging walls. The flow divider is coupled to the vanes in such a way that the flow divider moves together with the vanes when the vanes are adjusted.

20 Claims, 5 Drawing Sheets

CROP RESIDUE DISTRIBUTOR ASSEMBLY FOR A COMBINE HARVESTER

RELATED APPLICATION

This application claims priority to application DE 10 2022 111 434.1, filed May 9, 2022, which is hereby incorporated by reference herein in its entirety.

FIELD OF THE DISCLOSURE

The present disclosure relates generally to a combine harvester and more particularly to a crop residue distributor assembly for a combine harvester.

BACKGROUND

Combine harvesters are used to harvest plants containing grain. The plants are picked up from the field by a suitable harvesting attachment, in particular a cutting unit or a maize picker, and conveyed into the interior of the combine harvester by means of a feeder house. There they are threshed and in a separation device the grain remaining in the threshed crop is separated. A stream of crop residues consisting essentially of straw is expelled at the back of the combine harvester and deposited unchopped as a swath or chopped and distributed over the field. The grain obtained during threshing and separating is freed from impurities in a cleaning device and stored in a grain tank, from which it can be transferred onto a transport vehicle by a discharging auger conveyor.

The straw is usually chopped by a straw shredder, which is equipped with a housing and a rotor mounted therein in a rotatable manner, bearing pendulously mounted blades. The axis of rotation of the rotor extends horizontally and transversely to the direction of travel. The blades of the rotor work together with fixed counter knives attached to the housing. The chopped straw is ejected backwards and fed to a crop residue distributor.

In addition to crop residue distributor assemblies with driven throw blowers, passive crop residue distributor assemblies are used, especially for smaller cutting unit widths, which are essentially composed of a number of laterally arranged vanes arranged next to each other, which are arranged below a distributor hood. The vanes are angled or curved outwards and direct the crop residues outwards at an angle that is the larger the further out (left or right of the longitudinal median plane of the combine harvester) the respective vane is arranged.

To adapt to the respective conditions (cutting unit width, environmental conditions, such as side slope and wind, cornering, possibly already harvested surfaces), the vanes are adjustable by swivelling at their front ends around an approximately vertical axis on the distributor hood and at their rear ends are fixable in different positions on the distributor hood. The adjustment of the vanes can be carried out by hand and individually for each vane (U.S. Pat. No. 2,708,582 A), or a single actuator adjusts all vanes together (DE 38 38 936 C2, DE 103 36 772 A1) or an actuator is used for each left and right half of the harvest residue distributor assembly, respectively, which adjusts the vanes arranged there (DE 35 30 195 C1, DE 102 09 722 A1).

In some crop residue distributor assemblies, fixed (not laterally adjustable) vanes are arranged in the middle, which are shorter than the other vanes and offset from them to the rear and diverge from a front tip triangular to the rear (see DE 10 2009 011 094 A1, which is regarded as generic).

These fixed vanes are also referred to as middle flow dividers. They are used to avoid streaking in the area of the longitudinal median plane of the combine harvester due to excessive accumulation of undistributed (i.e. not laterally deflected) material.

A disadvantage of these fixed, middle flow dividers, however, is that they limit the lateral adjustment range of the adjustable vanes, since one of the vanes adjacent to the longitudinal media plane bumps into the flow divider when it is moved inwards (e.g., the innermost right vane is adjusted relatively far to the left). In addition, the distribution of the crop residues in the area of the flow divider is not optimal if the vanes are not in the neutral position, since the flow divider is then no longer symmetrically arranged compared to the vanes.

SUMMARY

As described herein, a crop residue distributor assembly is provided in which the disadvantages mentioned herein do not occur or occur to a reduced extent.

The disclosure provides a crop residue distributor assembly for a combine harvester, with: a straw distributor hood, below which a number of adjustable vanes is arranged on both sides of a longitudinal medial plane of the crop residue distributor assembly, and a flow divider with diverging walls is arranged adjacent to the longitudinal media plane.

The crop residue distributor assembly for a combine includes a straw distribution hood below which a number of adjustable vanes are arranged on both sides of a longitudinal median plane of the crop residue distributor assembly and a flow divider with diverging walls arranged adjacent to the longitudinal median plane. In one embodiment, the flow divider is coupled to the vanes in such a way that the flow divider moves together with the vanes when the vanes are adjusted.

The flow divider adapts to the position of the vanes to avoid the disadvantages mentioned.

In one implementation, there is provided a crop residue distributor assembly for a combine harvester including a straw distributor hood, below which a number of adjustable vanes is arranged on both sides of a longitudinal medial plane of the crop residue distributor assembly. A flow divider with diverging walls is adjacent to the longitudinal media plane, wherein the flow divider is coupled with the vanes in such a way that the flow divider moves together with the vanes when the vanes are adjusted.

In some implementations, the crop residue distributor assembly includes wherein the vanes are coupled with an adjustment lever, which is mounted rotatable around a lever axis extending transversely to the plane of the straw distributor hood, which is arranged on the median longitudinal plane of the crop residue distributor assembly, and the flow divider is rigidly connected to the adjustment lever.

In some implementations, the crop residue distributor assembly includes wherein the lever axis of the adjustment lever is approximately centered between a front and a rear end of the vanes with respect to the forward direction.

In some implementations, the crop residue distributor assembly includes wherein the vanes are arranged on each side of the longitudinal median plane at their front ends by a vane axis running transversely to the plane of the straw distribution hood in a pivoting manner and coupled to each other by an adjustment rod coupled to the adjustment lever.

In some implementations, the crop residue distributor assembly includes wherein the adjustment rod is rotatably coupled to a crossbar around a rod axis extending transversely to the plane of the straw distribution hood, which crossbar in turn is rotatably coupled to the adjustment lever around a crossbar axis running transversely to the plane of the straw distribution hood.

In some implementations, the crop residue distributor assembly includes wherein the crossbar is shiftingly coupled in the forward direction with the adjustment lever.

In some implementations, the crop residue distributor assembly includes wherein the adjustment lever is arranged above the straw distributor hood arranged and coupled to the adjustment lever by a first, front pin and a second, rear pin, both of which extend transversely to the plane of the straw distribution hood and through slotted holes arranged therein.

In some implementations, the crop residue distributor assembly includes wherein the adjustment lever is rotatable by an actuator around the lever axis.

In some implementations, the crop residue distributor assembly includes wherein the walls are rigidly connected to each other and arranged with their tip rear of the front ends of the vanes.

In another implementation, there is provided a combine harvester including a straw chopper and a crop residue distributor assembly mounted downstream of the straw chopper. The straw chopper includes a straw distributor hood, below which a number of adjustable vanes is arranged on both sides of a longitudinal medial plane of the crop residue distributor assembly and a flow divider. The flow divider includes diverging walls adjacent to the longitudinal media plane, wherein the flow divider is coupled with the vanes in such a way that the flow divider moves together with the vanes when the vanes are adjusted.

In some implementations, the combine harvester of includes wherein the vanes are coupled with an adjustment lever, which is mounted rotatable around a lever axis extending transversely to the plane of the straw distributor hood, which is arranged on the median longitudinal plane of the crop residue distributor assembly, and the flow divider is rigidly connected to the adjustment lever.

In some implementations, the combine harvester includes wherein the lever axis of the adjustment lever is approximately centered between a front and a rear end of the vanes with respect to the forward direction.

In some implementations, the combine harvester includes wherein the vanes are arranged on each side of the longitudinal median plane at their front ends by a vane axis running transversely to the plane of the straw distribution hood in a pivoting manner and coupled to each other by an adjustment rod coupled to the adjustment lever.

In some implementations, the combine harvester includes wherein the adjustment rod is rotatably coupled to a crossbar around a rod axis extending transversely to the plane of the straw distribution hood, which crossbar in turn is rotatably coupled to the adjustment lever around a crossbar axis running transversely to the plane of the straw distribution hood.

In some implementations, the combine harvester includes wherein the crossbar is shiftingly coupled in the forward direction with the adjustment lever.

In some implementations, the combine harvester includes wherein the adjustment lever is arranged above the straw distributor hood arranged and coupled to the adjustment lever by a first, front pin and a second, rear pin, both of which extend transversely to the plane of the straw distribution hood and through slotted holes arranged therein.

In some implementations, the combine harvester assembly includes wherein the adjustment lever is rotatable by an actuator around the lever axis.

In some implementations, the combine harvester includes wherein the walls are rigidly connected to each other and arranged with their tip rear of the front ends of the vanes.

In a further implementation, there is provided a method of distributing crop residues of a combine harvester with a crop residue distributor. The method includes: delivering the crop residues to the crop residue divider; adjusting a position of distributor vanes with respect to a distribution hood; moving a flow divider together with the adjusting the position of the distributor vanes in order to deflect the crop residues in a desired direction and to achieve an even distribution of the crop residues on a field.

In some implementations, the method further includes adjusting the position of the distributor vanes with at least one of an actuator controlled via an operator interface, an automatic control, or a handle.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

DETAILED DESCRIPTION

Figure 1:
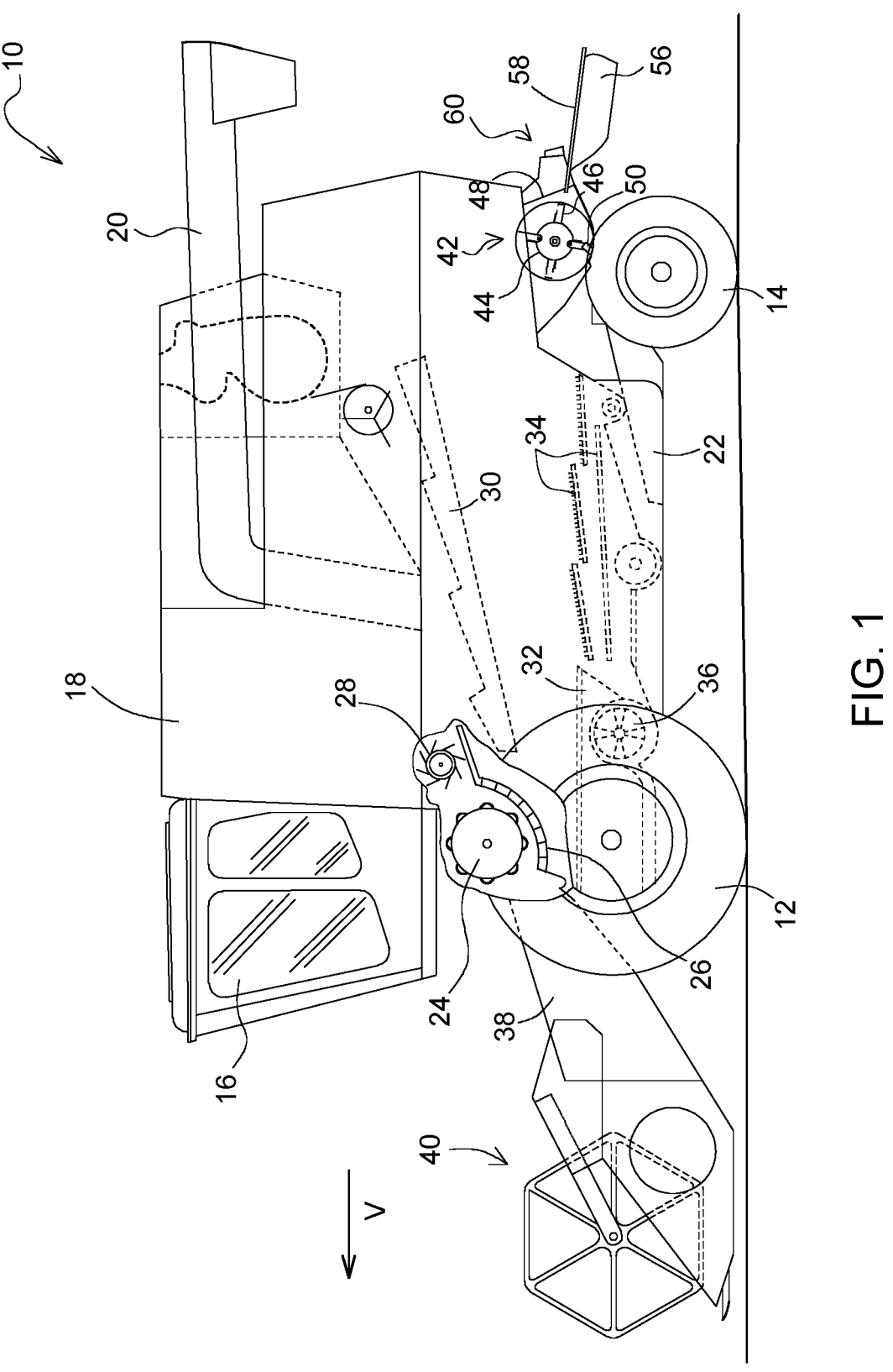
FIG. 1 shows a schematic side view of a combine harvester with a straw shredder and a crop residue distributor assembly.

A combine harvester 10 shown in FIG. 1 is supported on front driven and rear steerable wheels 12 and 14 respectively and has a driver's cab 16 from which it can be operated by a driver. A grain tank 18 adjoins the driver's cab 16 at the rear, which can deliver goods delivered into it to the outside via an emptying tube 20. The grain tank 18 is supported on a frame 22, in which the material supplied is dismantled into its large and small components on the way via a threshing drum 24, a threshing basket 26 and a beater 28. On subsequent straw walkers 30, as well as on a preparation floor 32 and sieves 34, a further separation of the harvested good is carried out, wherein finally the threshed portion of the material is conveyed into the grain tank 18, the large crop residues are fed via the straw walkers 30 to a straw chopper 42 and light components are fed by means of a blower 36 of the sieves 34 to the straw chopper 42 or blown by a chaff distributor to the floor. Material lying or standing on the ground is fed via a feeder house 38 to the threshing drum 24 after it has been picked up from the ground by a crop take-up device 40 in the form of a cutting platform. The tangential threshing arrangement shown here with the threshing drum 24 and straw walkers 30 as a separation device is only an embodiment and can be replaced by any threshing and separating devices, e.g., a multi-drum threshing device with the following straw walkers or one or more axial threshing and -separating rotors.

The straw chopper 42 comprises a hollow cylindrical rotor 44 with oscillating suspended blades 46 distributed around its circumference and length, which is connected to a drive in such a way that it rotates in a housing 48 around an approximately horizontal axis running transversely to the direction of travel. In conjunction with counter knives 50, the threshed, large harvest residues (especially straw) are chopped into shredded material. At the back of the straw chopper 42 is arranged a crop residue distributor assembly 60, which comprises a number vanes 56 arranged laterally side by side, which are arranged underneath a straw distribution hood 58.

Figure 2:
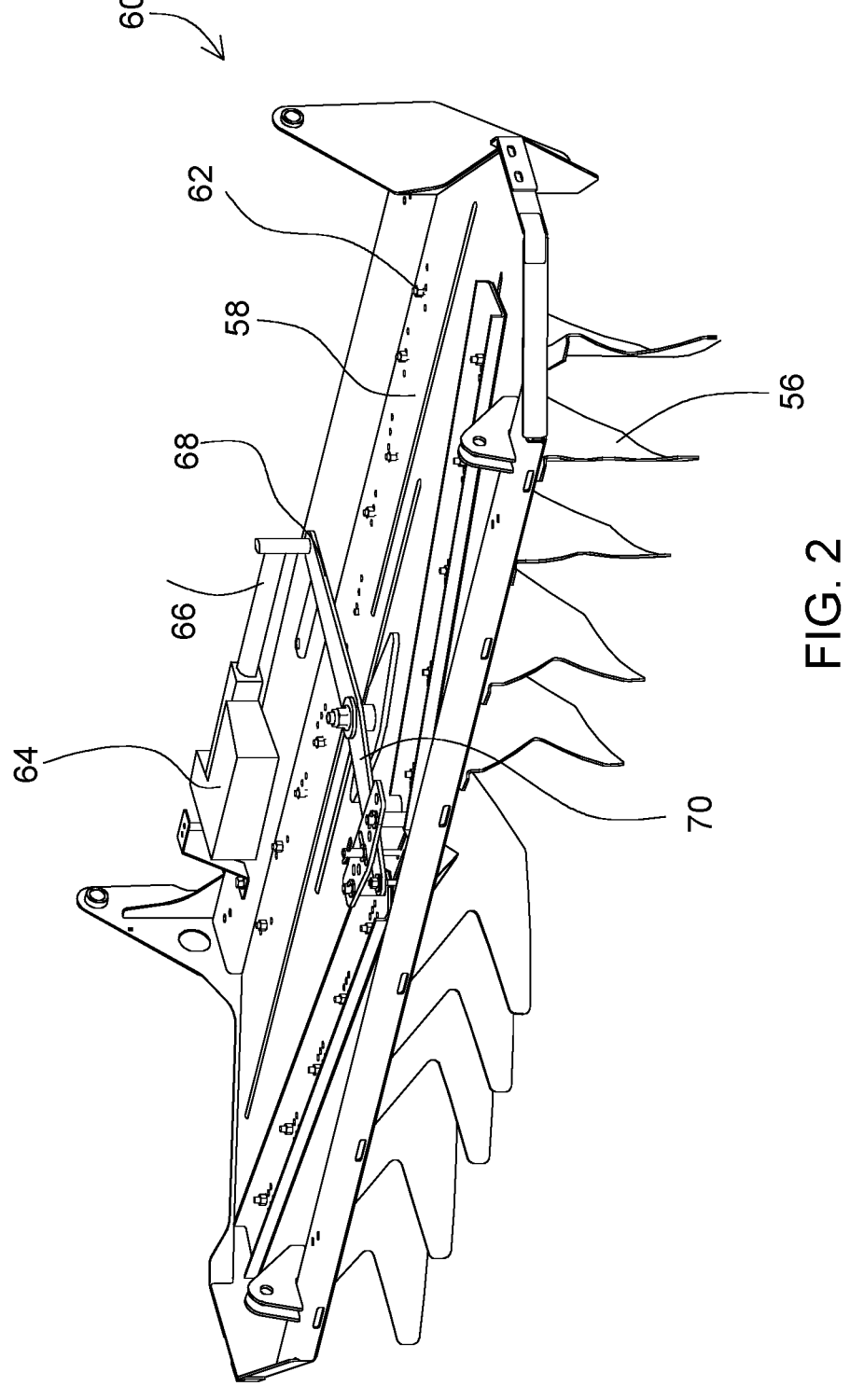
FIG. 2 shows a rear, perspective view of a crop residue distributor assembly in the neutral position of the vanes.
Figure 3:
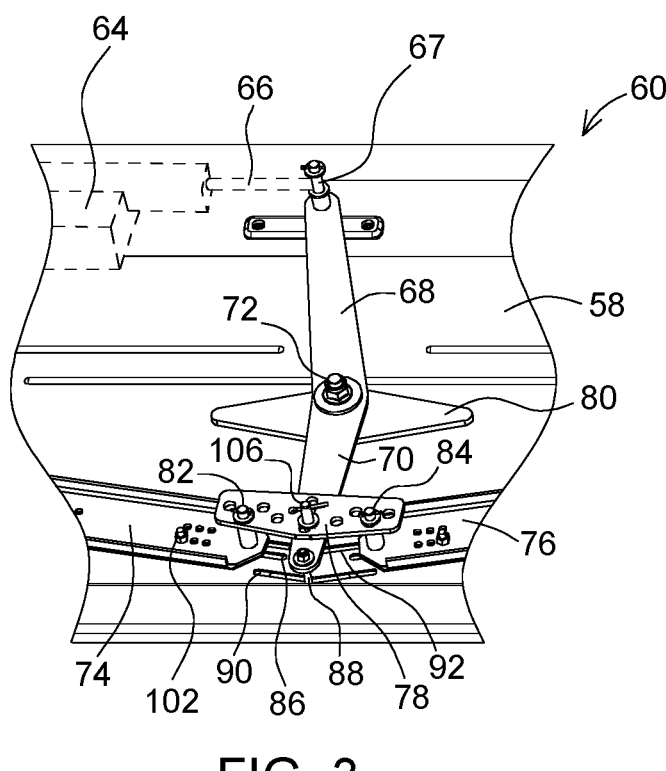
FIG. 3 shows a detail from a perspective view of the crop residue distributor assembly of FIG. 2 from behind and above.
Figure 4:
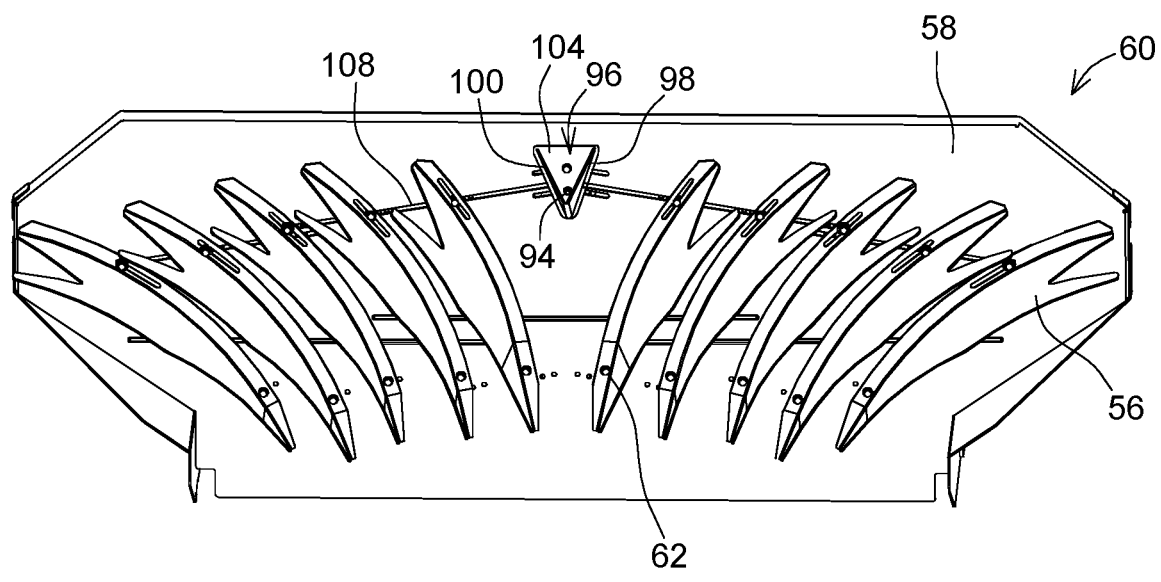
FIG. 4 shows a view of the crop residue distributor assembly in FIGS. 2 and 3 from below.

FIGS. 2, 3 and 4 show the crop residue distributor assembly 60 in a neutral position, in which the vanes 56 are arranged symmetrically to the longitudinal median plane of the combine harvester 10. The vanes 56 are swivelled to the straw distribution hood 58 at their front areas around axes 62, which extend transversely to the plane of the straw distributor hood 58. The vanes 56 are curved backwards and outwards, i.e. the vanes 56 located on the left half of the straw distributor hood 58 are curved to the left and those on the right half to the right. With the exception of the outermost vanes 56, the front ends of the vanes 56 form an imaginary circular arc.

The vanes 56 are adjustable to adapt to the respective conditions (wind, side slope, cornering, etc.). For this purpose, an actuator 64 is provided, which is controlled via an operator interface from cabin 18 or an automatic control (not shown). The actuator 64 comprises a linearly movable output member 66, which can be moved transversely to the forward direction V of the combine harvester 10 by the actuator 64.

The output member 66 is connected via a first swivel pin 67 to a first adjustment lever 68 pivotally around an axis oriented transversely to the plane of the straw distributor hood 58, which first adjustment lever 68 is hinged to a second swivel pin 72. The second swivel pin 72 is mounted on a reinforcement plate 80 connected to the straw distribution hood 58 to pivot around a swivel axis of rotation that extends transversely to the plane of the straw distribution hood 58. The first adjustment lever 68 is rigidly connected to a second adjustment lever 70 or both levers are designed in one piece. The rotation axis of the first adjustment lever 68 and the second adjustment lever 70, defined by the swivel pin 72, is located in the lateral direction on the longitudinal media plane of the crop residue distributor assembly 60 and thus on its symmetry axis. In forward direction V, the rotary axis of the second adjustment lever 70, defined by the swivel pin 72, is located approximately in the middle between the front axes 62, around which the vanes 56 swivel, and the rear ends of the vanes 56, although it could also be arranged further forward or backward.

The second adjustment lever 70 is connected on its end by a third swivel pin 86 to a crossbar 78 in a manner to pivot around an axis extending transversely to the plane of the straw distributor hood 58. The third swivel pin 86 extends through a slotted hole 106 in the crossbar 78. It would also be conceivable to arrange the slotted hole 106 in the second adjustment lever 70. The slotted hole 106 allows linear (displacement) movement between the adjustment lever 70 and the crossbar 78 when the adjustment lever 70 is rotated. This shifting movement makes sense due to the different trajectories of the adjustment lever 70 on the one hand and the adjustment rods 74, 76 coupled with it, which are described in the following paragraph, on the other hand.

Figure 5:
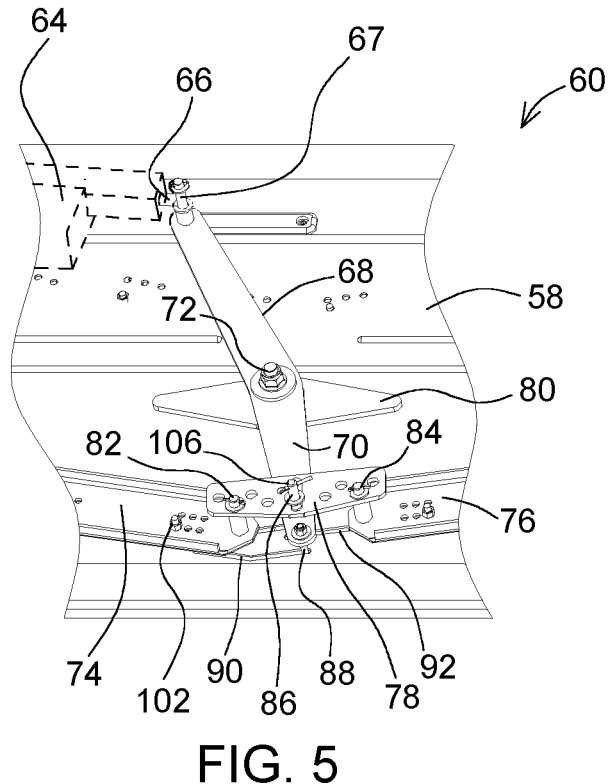
FIG. 5 shows a view according to FIG. 3, but with vanes adjusted to the left.

The crossbar 78 extends transversely to the forward direction and is pivotingly connected by a fourth swivel pin 82 and a fifth swivel pin 84 with a first (left) or a second (right) adjustment rod 74 or 76, each pivoting around an axis extending transversely to the plane of the straw distribution hood 58. The adjustment rods 74 and 76 are each swivelled to the rear areas of the vanes 56 by means of further swivel pins 102 around a swivel axis 58 that extends transversely to the plane of the straw distribution hood. In this way, the actuator 64 can adjust all vanes 56 to the left (see FIGS. 5 and 6) or to the right (FIGS. 7 and 8) in order to deflect the crop residues in a desired direction and to achieve an even distribution over the width of the crop take-up device 40. The holes in the adjustment rods 74, 76 allows a slight variation of the positions of the vanes 56.

Furthermore, as can be seen in FIGS. 2 to 8, a flow divider 96 is arranged in the area of the longitudinal media plane of the crop residue distributor assembly 60 and the combine harvester 10. The flow divider 96 comprises a left wall 98 and a right wall 100, which together form a triangle, the tip of which is located in front with regard to the forward direction V, and are rigidly connected to each other by a floor plate 104, which is arranged parallel to the plane of the straw distribution hood 58. The walls 98, 100 extend transversely to the plane of the straw distribution hood 58. The flow divider 96 is much shorter than the vanes 56 in terms of forward direction V. It is located in the gusset area between the innermost left and right vane 56 and is arranged with regard to the forward direction with its front tip approximately at the plane of their rear ends or slightly behind it. The flow divider 96, when the vanes 56 are in the neutral position in which they are symmetrically aligned to the longitudinal median plane of the combine harvester 10 (see FIGS. 2 to 4), is also symmetrically arranged to the longitudinal median plane of the combine harvester 10.

The flow divider 96 is, unlike in the prior art, not rigidly connected to the straw distributor hood 58, but moves together with the vanes 56 when these are adjusted by the actuator 64. For this purpose, the floor plate 104 of the flow divider 96 rigidly connected to the walls 98, 100 is coupled with the second adjustment lever 70 by a first, front pin 94 and a second, rear pin 88, both of which extend transversely to the plane of the straw distribution hood 58 and through slotted holes 90, 92 arranged therein. The slotted holes 90, 92 are arranged concentrically to the rotation axis of the second adjustment lever 70 defined by the swivel pin 72. By connecting the flow divider 96 to the second adjustment lever 70, the flow divider 96 rotates around the axis of rotation of the second adjustment lever 70 defined by the swivel pin 72, if the latter is adjusted by the actuator 64.

Figure 6:
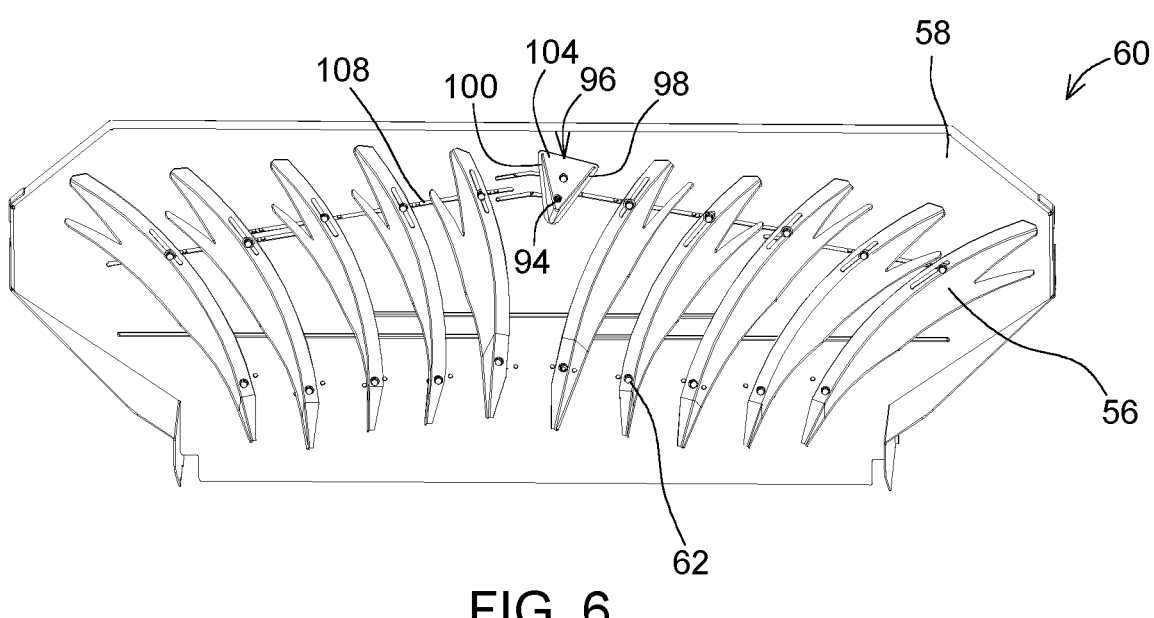
FIG. 6 shows a view of the crop residue distributor assembly of FIG. 5 from below.
Figure 7:
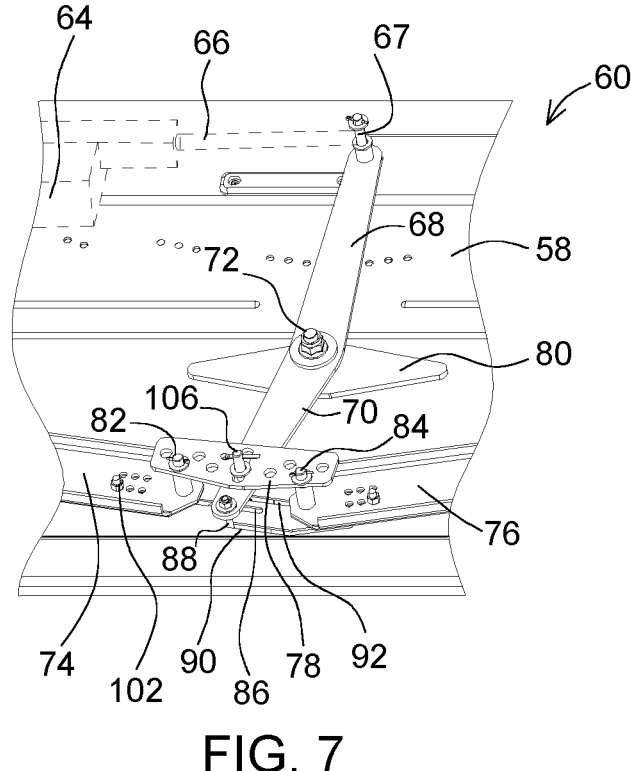
FIG. 7 shows a view according to FIG. 3, but with vanes adjusted to the right.
Figure 8:
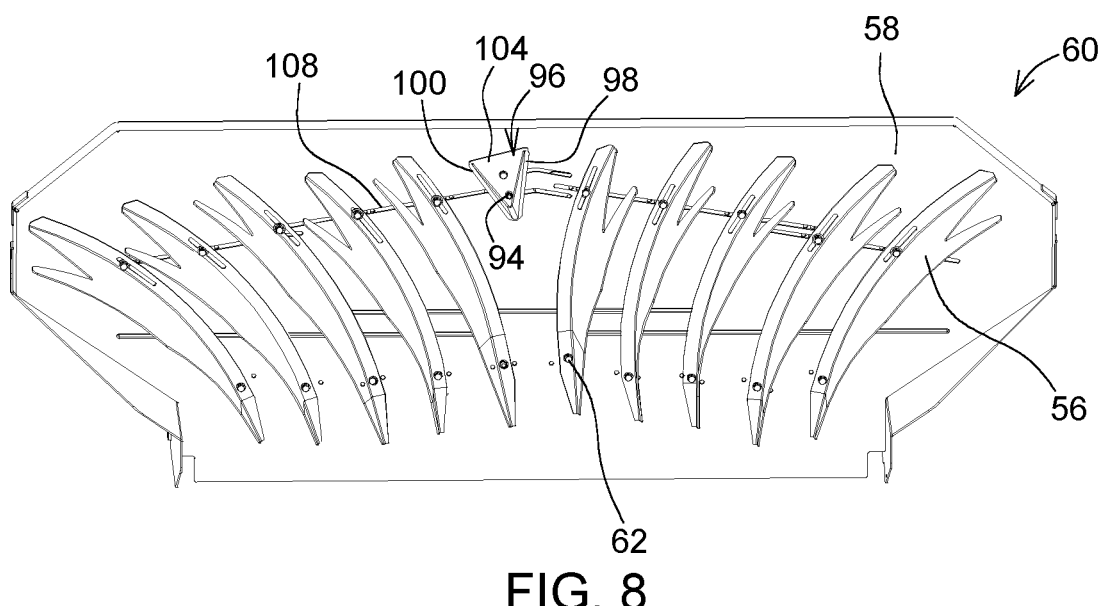
FIG. 8 shows a view of the crop residue distributor assembly in FIG. 7 from below.

In this way, as shown in FIGS. 4, 6 and 8, it is achieved that the flow divider 96 moves together with the vanes 56 to the left or right, namely rotates around the axis of rotation defined by the swivel pin 72. This ensures that the flow divider 96, unlike in the prior art, no longer forms an obstacle in the adjustment path of the vanes 56 and their adjustment range is increased, and that the orientation of the flow divider 96 is adapted to that of the vanes 56, which reduces the uniformity of the distribution of the crop residues on the field or ground rear of the flow divider 96 improved.

It can be seen that the actuator 64, the adjustment levers 68, 70, the crossbar 78 and the adjustment rods 74, 76 are separated from the flow of the crop residues and protected at the top of the straw distributor hood 58, while the vanes 56 and the flow divider 96 are attached to the underside of the straw distribution hood 58, and are located within the crop residue flow to distribute it laterally over the field. Through appropriate openings, in particular the slotted holes 90, 92 and corresponding slotted holes 108 for the swivel pins 102, the mechanical connection between the moving elements at the top and bottom of the straw distribution hood 58 takes place.

It should also be noted that one could dispense with the actuator 64 and the first adjustment lever 68, and instead the second adjustment lever 70 could be provided with a handle or similar to adjust the vanes 56 and the flow divider 96 by hand.

As shown in DE 10 2009 011 094 A1, 60 driven rotors could be attached to the outside of the crop residue distributor assembly in order to throw the crop residues far outwards.

While the above describes example implementations of the present disclosure, these descriptions should not be viewed in a limiting sense. Rather, other variations and modifications may be made without departing from the scope and spirit of the present disclosure as defined in the appended claims

The invention claimed is:

1. A crop residue distributor assembly for a combine harvester comprising:
   a straw distributor hood, below which a number of adjustable vanes is arranged on both sides of a longitudinal medial plane of the crop residue distributor assembly, and
   a flow divider with diverging walls rigidly connected to each other and adjacent to the longitudinal medial plane, wherein the flow divider is coupled with the vanes in such a way that the flow divider moves together with the vanes when the vanes are adjusted.

2. The crop residue distributor assembly of claim 1, wherein the vanes are coupled with an adjustment lever, which is mounted rotatable around a lever axis extending transversely to the plane of the straw distributor hood, which is arranged on the longitudinal medial plane of the crop residue distributor assembly, and the flow divider is rigidly connected to the adjustment lever.

3. The crop residue distributor assembly of claim 2, wherein the lever axis of the adjustment lever is approximately centered between a front and a rear end of the vanes with respect to the forward direction.

4. The crop residue distributor assembly of claim 2, wherein the vanes are arranged on each side of the longitudinal medial plane at their front ends by a vane axis running transversely to the plane of the straw distribution hood in a pivoting manner and coupled to each other by an adjustment rod coupled to the adjustment lever.

5. The crop residue distributor assembly of claim 4, wherein the adjustment rod is rotatably coupled to a crossbar around a rod axis extending transversely to the plane of the straw distribution hood, which crossbar in turn is rotatably coupled to the adjustment lever around a crossbar axis running transversely to the plane of the straw distribution hood.

6. The crop residue distributor assembly of claim 5, wherein the crossbar is shiftingly coupled in the forward direction with the adjustment lever.

7. The crop residue distributor assembly of claim 2, wherein the adjustment lever is arranged above the straw distributor hood arranged and coupled to the adjustment lever by a first, front pin and a second, rear pin, both of which extend transversely to the plane of the straw distribution hood and through slotted holes arranged therein.

8. The crop residue distributor assembly of claim 2, wherein the adjustment lever is rotatable by an actuator around the lever axis.

9. The crop residue distributor assembly of claim 1, wherein the walls are arranged with their tip rear of the front ends of the vanes.

10. A combine harvester comprising:
   a straw chopper; and
   a crop residue distributor assembly mounted downstream of the straw chopper, wherein the straw chopper includes a straw distributor hood, below which a number of adjustable vanes is arranged on both sides of a longitudinal medial plane of the crop residue distributor assembly, and a flow divider with diverging walls rigidly connected to each other and adjacent to the longitudinal medial plane, wherein the flow divider is coupled with the vanes in such a way that the flow divider moves together with the vanes when the vanes are adjusted.

11. The combine harvester of claim 10, wherein the vanes are coupled with an adjustment lever, which is mounted rotatable around a lever axis extending transversely to the plane of the straw distributor hood, which is arranged on the longitudinal medial plane of the crop residue distributor assembly, and the flow divider is rigidly connected to the adjustment lever.

12. The combine harvester of claim 11, wherein the lever axis of the adjustment lever is approximately centered between a front and a rear end of the vanes with respect to the forward direction.

13. The combine harvester of claim 11, wherein the vanes are arranged on each side of the longitudinal medial plane at their front ends by a vane axis running transversely to the plane of the straw distribution hood in a pivoting manner and coupled to each other by an adjustment rod coupled to the adjustment lever.

14. The combine harvester of claim 13, wherein the adjustment rod is rotatably coupled to a crossbar around a rod axis extending transversely to the plane of the straw distribution hood, which crossbar in turn is rotatably coupled to the adjustment lever around a crossbar axis running transversely to the plane of the straw distribution hood.

15. The combine harvester of claim 14, wherein the crossbar is shiftingly coupled in the forward direction with the adjustment lever.

16. The combine harvester of claim 11, wherein the adjustment lever is arranged above the straw distributor hood arranged and coupled to the adjustment lever by a first, front pin and a second, rear pin, both of which extend transversely to the plane of the straw distribution hood and through slotted holes arranged therein.

17. The combine harvester assembly of claim 11, wherein the adjustment lever is rotatable by an actuator around the lever axis.

18. The combine harvester of claim 10, wherein the walls are arranged with their tip rear of the front ends of the vanes.

19. A method of distributing crop residues of a combine harvester with a crop residue distributor, the method comprising:
   delivering the crop residues to the crop residue distributor;
   adjusting a position of distributor vanes with respect to a distribution hood; and moving a flow divider, having diverging walls rigidly connected to each other, together with the adjusting the position of the distributor vanes in order to deflect the crop residues in a desired direction and to achieve an even distribution of the crop residues on a field.

20. The method of claim 19 further comprising adjusting the position of the distributor vanes with at least one of an actuator controlled via an operator interface, an automatic control, or a handle.

\* \* \* \* \*